(12) United States Patent
Asano et al.

(10) Patent No.: US 12,415,920 B2
(45) Date of Patent: Sep. 16, 2025

(54) THERMOSETTING RESIN COMPOSITION, THERMOSETTING RESIN CURED PRODUCT, PREPREG AND FIBER-REINFORCED COMPOSITE MATERIAL

(71) Applicant: Toray Industries, Inc., Tokyo (JP)

(72) Inventors: Itaru Asano, Nagoya (JP); Atsuhito Arai, Ehime (JP); Ryohei Watari, Ehime (JP); Tomohiko Nakamura, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 598 days.

(21) Appl. No.: 17/783,072

(22) PCT Filed: Dec. 18, 2020

(86) PCT No.: PCT/JP2020/047472
§ 371 (c)(1),
(2) Date: Jun. 7, 2022

(87) PCT Pub. No.: WO2021/132091
PCT Pub. Date: Jul. 1, 2021

(65) Prior Publication Data
US 2023/0054021 A1 Feb. 23, 2023

(30) Foreign Application Priority Data
Dec. 23, 2019 (JP) ................. 2019-231132

(51) Int. Cl.
| | | |
|---|---|---|
| *C08L 63/00* | (2006.01) | |
| *C08G 59/50* | (2006.01) | |
| *C08G 69/14* | (2006.01) | |
| *C08G 69/40* | (2006.01) | |
| *C08J 5/04* | (2006.01) | |
| *C08J 5/24* | (2006.01) | |

(52) U.S. Cl.
CPC .......... *C08L 63/00* (2013.01); *C08G 59/5033* (2013.01); *C08G 69/14* (2013.01); *C08G 69/40* (2013.01); *C08J 5/042* (2013.01); *C08J 5/243* (2021.05); *C08J 2363/00* (2013.01); *C08J 2377/02* (2013.01); *C08L 2205/18* (2013.01)

(58) Field of Classification Search
CPC ....... C08L 63/00; C08L 2205/18; C08J 5/243; C08J 5/042; C08J 2363/00; C08J 2377/02; C08G 59/5033; C08G 69/14; C08G 69/40

USPC .......................................... 523/461
See application file for complete search history.

(56) References Cited

U.S. PATENT DOCUMENTS

| | | |
|---|---|---|
| 5,169,710 A | 12/1992 | Qureshi et al. |
| 2014/0162518 A1 | 6/2014 | Shimizu et al. |
| 2015/0344686 A1 | 12/2015 | Shimizu et al. |
| 2016/0122528 A1 | 5/2016 | Kobayashi et al. |
| 2016/0200910 A1 | 7/2016 | Mutsuda et al. |
| 2018/0258240 A1* | 9/2018 | Mutsuda .................. C08J 5/042 |
| 2019/0161587 A1 | 5/2019 | Mutsuda et al. |
| 2020/0010634 A1 | 1/2020 | Harada et al. |
| 2020/0048413 A1 | 2/2020 | Asano |
| 2021/0002476 A1 | 1/2021 | Aerts et al. |

FOREIGN PATENT DOCUMENTS

| | | |
|---|---|---|
| JP | H5-1159 A | 1/1993 |
| JP | 2011-162619 A | 8/2011 |
| JP | 2018-66016 A | 4/2018 |
| WO | 2018/174250 A1 | 9/2002 |
| WO | 2014/115844 A1 | 7/2014 |
| WO | 2015/019965 A1 | 2/2015 |
| WO | 2015/033998 A1 | 3/2015 |
| WO | 2018/016138 A1 | 1/2018 |
| WO | 2018/207728 A1 | 11/2018 |

OTHER PUBLICATIONS

International Search Report dated Mar. 9, 2021 in counterpart International Application No. PCT/JP2020/047472.
Written Opinion dated Mar. 9, 2021 in counterpart International Application No. PCT/JP2020/047472.
Extended European Search Report dated Nov. 9, 2023, of counterpart European Patent Application No. 20904550.9.

* cited by examiner

*Primary Examiner* — David T Karst
(74) *Attorney, Agent, or Firm* — DLA Piper LLP (US)

(57) ABSTRACT

A thermosetting resin composition contains at least: [A] a thermosetting resin; [B] a curing agent; and [C] polyamide particles satisfying following (c1) to (c6): (c1) a melting point of polyamide resin constituting the polyamide particles is 200 to 300° C.; (c2) a crystallization temperature of the polyamide resin constituting the polyamide particles is 150° C. to 250° C.; (c3) a number average particle size of the polyamide particles is 1 to 100 μm; (c4) a sphericity of the polyamide particles is 80 to 100; and (c5) the linseed oil absorption of the polyamide particles is 10 to 100 mL/100 g. A thermosetting resin composition of the present invention enables suitable production of a fiber-reinforced composite material having sufficient compressive strength after impact and wet heat compression performance.

11 Claims, No Drawings

THERMOSETTING RESIN COMPOSITION, THERMOSETTING RESIN CURED PRODUCT, PREPREG AND FIBER-REINFORCED COMPOSITE MATERIAL

TECHNICAL FIELD

This disclosure relates to a thermosetting resin composition, a fiber-reinforced composite material suitable for aerospace applications, a prepreg to obtain the same, further, a thermosetting resin cured product suitably used as a matrix resin of the fiber-reinforced composite material, and a thermosetting resin composition.

BACKGROUND

Fiber-reinforced composite materials, in particular, carbon fiber-reinforced composite materials (CFRP) are excellent in specific strength and specific rigidity, and the use thereof has been developing widely for airplane structural members, blades of windmills, exterior plates of automobiles, and members for computers such as IC trays or laptop enclosures (housings).

CFRP is a heterogeneous material obtained by molding a prepreg containing carbon fibers as reinforcing fibers and a matrix resin as essential constituent elements. Therefore, CFRP exhibits a large difference between physical properties in the arrangement direction of the reinforcing fibers and physical properties in any directions other than the arrangement direction of the reinforcing fibers. In particular, a carbon fiber-reinforced composite material containing a thermosetting resin as a matrix resin is easily destroyed by a strain along any direction other than the arrangement direction of the reinforcing fibers because the matrix resin is low in toughness. Various techniques to improve toughness have been proposed for a carbon fiber-reinforced composite material containing a thermosetting resin as a matrix resin.

As one of the techniques to improve the toughness, it has been proposed that by blending resin particles into a thermosetting resin, high toughness and good heat resistance are imparted to a carbon fiber-reinforced composite material while moldability of a prepreg is maintained. For example, a technique of achieving both impact resistance and tensile strength by using polyamide particles having a specific structure as resin particles is disclosed (Japanese Patent Laid-open Publication No. 2011-162619). A technique of improving toughness by controlling the melting point of particles in a low range with copolymerized particles of nylon 12 and nylon 6 is disclosed (International Publication WO 2018/174250). In addition, a technique of achieving both impact resistance (compressive strength after impact) and wet heat compression performance, which is a further important property, with polyamide 1010 particles, polyamide 12 particles or the like is disclosed (Japanese Patent Laid-open Publication No. 2018-66016).

However, in the technique described in JP '619, sufficient compressive strength after impact cannot be imparted. In the techniques described in WO '250 and JP '016, compressive strength after impact can be imparted, but there is a problem that wet heat compression performance is low.

It could therefore be helpful to provide a fiber-reinforced composite material capable of achieving both compressive strength after impact and wet heat compression performance.

SUMMARY

We thus provide:
A thermosetting resin composition containing at least:
[A] a thermosetting resin;
[B] a curing agent; and
[C] polyamide particles satisfying following (c1) to (c5):
  (c1) a melting point of polyamide resin constituting the polyamide particles is 200 to 300° C.;
  (c2) a crystallization temperature of the polyamide resin constituting the polyamide particles is 150° C. to 250° C.;
  (c3) a number average particle size of the polyamide particles is 1 to 100 µm;
  (c4) a sphericity of the polyamide particles is 80 to 100; and
  (c5) a linseed oil absorption of the polyamide particles is 10 to 100 mL/100 g.

The thermosetting resin composition can be used for a fiber-reinforced composite material. In particular, the thermosetting resin composition enables suitable production of a fiber-reinforced composite material having sufficient compressive strength after impact and wet heat compression performance.

A thermosetting resin composition can be suitably used as a prepreg, and further as a thermosetting resin cured product which is a matrix resin of a fiber-reinforced composite material.

A fiber-reinforced composite material produced using the thermosetting resin composition has high tensile strength, high impact resistance, and high chemical resistance, and thus can be widely used for general industrial applications such as windmills, automobiles, and bicycles, including aerospace applications requiring high mechanical properties.

DETAILED DESCRIPTION

Hereinafter, our compositions, products, prepregs and materials will be described in detail.

The thermosetting resin [A] represents a compound that forms a three-dimensional crosslinked structure by heating. Specific examples of the thermosetting resin include epoxy resin, benzoxazine resin, vinyl ester resin, unsaturated polyester resin, urethane resin, phenolic resin, melamine resin, maleimide resin, cyanurate resin, and urea resin. Of these resins, epoxy resin, benzoxazine resin, vinyl ester resin, unsaturated polyester resin, and phenolic resin, and any mixture of two or more of these resins are preferably used as a thermosetting resin since the resins and the mixture are high in mechanical properties. In particular, epoxy resin is especially preferred since the resin is excellent in mechanical properties, and bondability to the reinforcing fibers.

As the epoxy resin, a compound is used which has, in a single molecule thereof, two or more epoxy groups. The epoxy resin may be specifically, for example, an epoxy resin having an aromatic glycidyl ether obtained from a phenolic compound having hydroxyl groups, an aliphatic glycidyl ether obtained from an alcohol having hydroxyl groups, a glycidyl amine obtained from an amine, a glycidyl ester obtained from a carboxylic acid having carboxyl groups, or an oxirane ring and the like.

Of these examples, a glycidyl amine type epoxy resin is preferably usable since the resin is low in viscosity to be excellent in impregnation performance into the reinforcing fibers, and further excellent in heat resistance, and elastic modulus and other mechanical properties when the resin is made into a fiber-reinforced composite material. The glycidyl amine type epoxy resin can be roughly classified into any polyfunctional amine type epoxy resin and any bifunctional amine type epoxy resin.

The polyfunctional amine type epoxy resin may be a glycidyl amine type epoxy resin containing, in a single molecule thereof, three or more epoxy groups. The polyfunctional amine type epoxy resin may be, for example, tetraglycidyldiaminodiphenylmethane, triglycidylaminophenol or tetraglycidylxylylenediamine; any halogen-substituted compound, alkyl-group-substituted compound, aralkyl-group-substituted compound, alkenyl-group-substituted compound, alkoxy-group-substituted compound, aralkoxy-group-substituted compound or allyloxy-group-substituted compound; or hydrogenated products thereof. The bifunctional amine type epoxy resin is also usable. The compound may be, for example, diglycidylaniline; any halogen-substituted compound, alkyl-group-substituted compound, aralkyl-group-substituted compound, allyl-group-substituted compound, alkoxy-group-substituted compound, aralkoxy-group-substituted compound or allyloxy-group-substituted compound of diglycidylaniline; or hydrogenated products thereof.

Preferred examples of the polyfunctional amine type epoxy resin include tetraglycidyldiaminodiphenylmethane, triglycidylaminophenol and tetraglycidylxylylenediamine; and substituted compounds and hydrogenated products thereof.

As the compound tetraglycidyldiaminodiphenylmethane, for example, the following products are usable: "SUMI-EPOXY (registered trademark)" ELM434, (manufactured by Sumitomo Chemical Co., Ltd.), YH434L (manufactured by Nippon Steel & Sumitomo Metal Corp.), "jER (registered trademark)" 604 (manufactured by Mitsubishi Chemical Corporation), "Araldite (registered trademark)" MY720 and MY721 (manufactured by Huntsman Advanced Material LLC), and the like. As the compound triglycidylaminophenol or an alkyl-substituted compound thereof, the following products are usable: "SUMI-EPOXY (registered trademark)" ELM100 and ELM120 (manufactured by Sumitomo Chemical Co., Ltd.), "Araldite (registered trademark)" MY0500, MY0510 and MY0600 (manufactured by Huntsman Advanced Material LLC), and "jER (registered trademark)" 630 (manufactured by Mitsubishi Chemical Corporation). As the compound tetraglycidylxylylenediamine or a hydrogenated product thereof, the following products are usable: "TETRAD (registered trademark)"—X, and "TETRAD (registered trademark)"—C (manufactured by Mitsubishi Gas Chemical Co., Inc.).

The polyfunctional amine type epoxy resin is preferably usable as the epoxy resin since a resin cured product obtained therefrom is excellent in balance between heat resistance and mechanical properties such as elastic modulus. The polyfunctional amine type epoxy resin is contained desirably in a proportion of 40 to 70 mass % of all epoxy resin.

The epoxy resin may contain, for example, any epoxy resin other than glycidyl amine, or a copolymer of an epoxy resin and a thermosetting resin. Examples of the thermosetting resin used to be copolymerized with the epoxy resin include unsaturated polyester resin, vinyl ester resin, epoxy resin, benzoxazine resin, phenolic resin, urea resin, melamine resin, and polyimide resin. These resin compositions and compounds may be used alone or in the form of an appropriate blend.

As a bifunctional epoxy resin, out of epoxy resins usable as the epoxy resin other than glycidyl amine, it is preferred to use a glycidyl ether type epoxy resin, a precursor of which is phenol. Examples of this epoxy resin include bisphenol A type epoxy resin, bisphenol F type epoxy resin, bisphenol S type epoxy resin, naphthalene type epoxy resin, biphenyl type epoxy resin, urethane-modified epoxy resin, and hydantoin type and resorcinol type epoxy resins.

The glass transition temperature of the thermosetting resin is preferably 120 to 250° C., more preferably 140 to 210° C. to cause the resultant composite material to ensure a sufficient heat resistance and compressive strength under wet heat conditions required for an airplane material.

The curing agent [B] denotes the following compound when an epoxy resin is used as the thermosetting resin: a compound having an active group reactive with epoxy groups of the resin. Specific examples of the curing agent for the epoxy resin include dicyan diamide, aromatic polyamines, aminobenzoates, various acid anhydrides, phenol novolak resin, cresol novolak resin, polyphenol compounds, imidazole derivatives, aliphatic amines, tetramethylguanidine, thiourea-added amines, carboxylic anhydrides such as methylhexahydrophthalic anhydride, carboxylic acid hydrazides, carboxylic acid amides, polymercaptans, and Lewis acid complexes such as an ethylamine boron trifluoride complex.

The use of any one of the aromatic polyamines as a curing agent makes it possible to yield an epoxy resin cured product good in heat resistance. Of the aromatic polyamines, the most suitable curing agents are diaminodiphenylsulfone, derivatives thereof, and various isomers thereof to yield an epoxy resin cured product good in heat resistance.

The use of a combination of dicyan diamide with a urea compound such as 3,4-dichlorophenyl-1,1-dimethylurea, or use of an imidazole compound as the curing agent yields high heat and water resistance while curing is performed at a relatively low temperature. The use of an acid anhydride to cure an epoxy resin provides a cured product that has a lower water absorption percentage compared to curing with an amine compound. Additionally, when using a curing-power-latently-exhibiting product of any one of the above-mentioned curing agents, for example, a product in which the agent is micro-encapsulated, the resultant prepreg is not easily changed in storage stabilities, in particular, tackiness and drape even when allowed to stand still at room temperature.

The optimum value of the addition amount of the curing agent varies depending on the types of the thermosetting resin and the curing agent, but it is preferable to add the curing agent to be stoichiometrically equivalent. The above-mentioned curing agents may be used alone or in any combination of two or more thereof.

Commercial products of aromatic polyamine curing agents include Seikacure S (manufactured by Wakayama Seika Kogyo Co., Ltd.), MDA-220 (manufactured by Mitsui Chemicals, Inc.), "jER Cure (registered trademark)" W (manufactured by Mitsubishi Chemical Corporation), 3,3'-DAS (manufactured by Mitsui Chemicals, Inc.), Lonzacure (registered trademark) M-DEA (manufactured by Lonza), Lonzacure (registered trademark) M-DIPA (manufactured by Lonza), Lonzacure (registered trademark) M-MIPA (manufactured by Lonza), and Lonzacure (registered trademark) DETDA 80 (manufactured by Lonza).

The epoxy resin and any one of these curing agents, or a product obtained by causing the two partially to react preliminarily with each other may be incorporated into the composition. This manner is, in some instances, effective in adjusting the viscosity of the composition, or improving the composition in storage stability.

The polyamide particles [C] are polyamide particles satisfying (c1) to (c5):
(c1) the melting point of polyamide resin constituting the polyamide particles is 200° C. to 300° C.;
(c2) a crystallization temperature of the polyamide resin constituting the polyamide particles is 150° C. to 250° C.;
(c3) a number average particle size of the polyamide particles is 1 to 100 μm;
(c4) a sphericity of the polyamide particles is 80 to 100; and
(c5) a linseed oil absorption of the polyamide particles is 10 to 100 mL/100 g.

We found that polyamide particles satisfying the above conditions (c1) to (c5) yield CFRP that exhibits elastic modulus, strength, and toughness of a thermosetting resin cured product, which conventionally had a trade-off relationship, in a well-balanced manner, and that is good in compressive strength after impact and wet heat compression performance while being high in chemical resistance and heat resistance.

The polyamide resin constituting the polyamide fine particles refers to a polymer having a structure including an amide group.

The melting point of the polyamide resin constituting the polyamide particles is 200° C. to 300° C. A polyamide resin having such a high melting point increases the heat resistance and chemical resistance of the thermosetting resin cured product, and thus allows CFRP to exhibit excellent wet heat compression performance. Such a polyamide resin can also increases the chemical resistance of the thermosetting resin cured product and CFRP. Furthermore, such a polyamide resin can suppress deformation of polyamide particles caused by heating when the thermosetting resin composition containing the polyamide particles is molded into a prepreg, and thus maintain high fluidity. The range of the melting point is preferably 205° C. or higher, and more preferably 210° C. or higher. When the melting point is too high, the toughness of the thermosetting resin cured product and the compressive strength after impact of CFRP are reduced. Therefore, the upper limit of the melting point is preferably 300° C. or lower, more preferably 270° C. or lower, more preferably 250° C. or lower, and still more preferably 230° C. or lower.

The melting point of the polyamide resin constituting the polyamide particles is preferably 205° C. to 270° C., and more preferably 210° C. to 250° C.

The melting point of the polyamide constituting the polyamide particles is the apex of an endothermic peak when the temperature is raised from 30° C. at a rate of 20° C./min in a nitrogen atmosphere using a DSC method.

The crystallization temperature of the polyamide resin constituting the polyamide particles is 150° C. to 250° C. A polyamide resin having a crystallization temperature in a specific temperature range yields a thermosetting resin cured product having extremely high strength, and further, allows a fiber-reinforced composite material produced using the thermosetting resin cured product to maintain compression performance even under wet heat conditions. Such a polyamide resin can also increases the chemical resistance of the thermosetting resin cured product and CFRP. The crystallization temperature of the polyamide resin is preferably 160° C. or higher, more preferably 165° C. or higher, and still more preferably 170° C. or higher. When the crystallization temperature is too high, the rigidity of the thermosetting resin cured product may be too high so that the toughness of the thermosetting resin cured product may be reduced, or the compressive strength after impact of CFRP may be reduced. Therefore, the upper limit of the crystallization temperature is 250° C. or lower, preferably 210° C. or lower, more preferably 195° C. or lower, and still more preferably 180° C. or lower.

The crystallization temperature of the polyamide resin constituting the polyamide particles is preferably 160° C. to 210° C., more preferably 165° C. to 195° C., and still more preferably 170° C. to 180° C.

The crystallization temperature of the polyamide constituting the polyamide particles is measured by a DSC method as with the melting point. The crystallization temperature is the apex of an exothermic peak which appears when the temperature is raised from 30° C. to a temperature 30° C. higher than the endothermic peak indicating the melting point of the polyamide at a rate of 20° C./min, held for 1 minute, and then cooled to 30° C. at a rate of 20° C./min in a nitrogen atmosphere. When there is no crystallization temperature, no exothermic peak appears.

Specific examples of such a polyamide resin include polyamide 4, polycaproamide (polyamide 6), polyhexamethylene adipamide (polyamide 66), polytetramethylene adipamide (polyamide 46), polytetramethylene sebacamide (polyamide 410), polypentamethylene adipamide (polyamide 56), polypentamethylene sebacamide (polyamide 510), polyhexamethylene sebacamide (polyamide 610), polyhexamethylene dodecamide (polyamide 612), polydecamethylene adipamide (polyamide 106), polydodecamethylene adipamide (polyamide 126), polycaprylamide (polyamide 8), polyhexamethylene terephthalamide (polyamide 6T), polydecamethylene terephthalamide (polyamide 10T), polydodecamethylene terephthalamide (polyamide 12T), polycaproamide/polyhexamethylene adipamide copolymers (polyamide 6/66), and polycaproamide/polydodecamide copolymers (polyamide 6/12). Polycaproamide (polyamide 6), polyhexamethylene adipamide (polyamide 66), polycaprylamide (polyamide 8), polyhexamethylene terephthalamide (polyamide 6T), polydecamethylene terephthalamide (polyamide 10T), polydodecamethylene terephthalamide (polyamide 12T), polycaproamide/polyhexamethylene adipamide copolymers (polyamide 6/66), and polycaproamide/polydodecamide copolymers (polyamide 6/12) are preferable because these polyamide resins allow CFRP to exhibit excellent wet heat compression performance. Polycaproamide (polyamide 6), polycaprylamide (polyamide 8), and polycaproamide/polydodecamide copolymers (polyamide 6/12) are particularly preferable in terms of CAI.

The polyamide resin constituting the polyamide particles preferably contains 60 mass % or more of a constituent unit of formula (1). A polyamide resin having a structural unit in such a range allows the thermosetting resin cured product to maintain toughness while exhibiting high elastic modulus and high strength, and thus achieves the compressive strength after impact and wet heat compression performance in a good balance when the resin is made into a fiber-reinforced composite material.

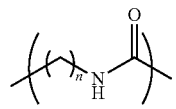
(1)

wherein n represents an integer of 4 to 7.

From the viewpoint of exhibiting compressive strength after impact and wet heat compression performance in a good balance when the resin is made into CFRP, n is an integer of 5, that is, polyamide 6 is most preferable. As the content of the constituent unit of formula (1) in the polyamide resin is higher, both the compressive strength after impact and the wet heat compression performance can be achieved. Therefore, the content of the constituent unit is preferably 70 mass % or more, more preferably 80 mass % or more, still more preferably 90 mass % or more, and particularly preferably 100 mass %.

The content of the constituent unit of formula (1) in the polyamide resin constituting the polyamide particles is a value measured as follows. That is, the polyamide particles are hydrolyzed with hydrochloric acid or the like, and the amount of ε-caprolactam as a monomer thereof is quantified by gas chromatography to calculate mass % thereof.

The polyamide resin constituting the polyamide particles may contain any component other than the constituent unit. The component is not limited as long as it is a copolymerizable component. Examples thereof include polyundecamide (polyamide 11), polylauroamide (polyamide 12), polyhexamethylene adipamide (polyamide 66), polydecamethylene sebacamide (polyamide 1010), polydodecamethylene dodecamide (polyamide 1212), polyhexamethylene sebacamide (polyamide 610), polyhexamethylene dodecamide (polyamide 612), polydecamethylene adipamide (polyamide 106), polydodecamethylene adipamide (polyamide 126), polyhexamethylene terephthalamide (polyamide 6T), polydecamethylene terephthalamide (polyamide 10T), polydodecamethylene terephthalamide (polyamide 12T), and amorphous polyamides.

The weight average molecular weight of the polyamide resin constituting the polyamide particles is 5,000 to 500,000. When the weight average molecular weight is too low, the compressive strength after impact of CFRP is reduced. Therefore, the weight average molecular weight is preferably 10,000 or more, more preferably 20,000 or more, and still more preferably 30,000 or more. When the weight average molecular weight is too high, the dispersibility in the thermosetting resin composition becomes poor. Therefore, the weight average molecular weight is preferably 300,000 or less, more preferably 200,000 or less, and particularly preferably 100,000 or less.

The weight average molecular weight of the polyamide constituting the polyamide particles refers to a weight average molecular weight converted from a value measured by gel permeation chromatography using hexafluoroisopropanol as a solvent in terms of polymethyl methacrylate.

It is important that the number average particle size of the polyamide particles is in the range of 1 to 100 μm to obtain the mechanical properties and moldability of the thermosetting resin cured product and CFRP. When the number average particle size exceeds 100 μm the moldability into a prepreg is deteriorated. The number average particle size of the polyamide fine particles is preferably 80 μm or less, more preferably 50 μm or less, and still more preferably 30 μm or less. When the number average particle size is less than 1 μm, the compressive strength after impact of CFRP is reduced. Aggregation of particles occurs. The number average particle size of the polyamide fine particles is preferably 2 μm or more, more preferably 3 μm or more, and still more preferably 5 μm or more.

The number average particle size of the polyamide particles is preferably 2 μm to 80 μm, more preferably 3 μm to 50 μm, and still more preferably 5 μm to 30 μm.

The number average particle size of the polyamide fine particles can be obtained by randomly specifying 100 particle diameters from a scanning electron micrograph and calculating the arithmetic average thereof. In the above micrograph, when the particle is not a perfect circle, that is, when the particle is elliptical, the maximum size of the particle is defined as the particle size. To accurately measure the particle size, the particle size is measured at a magnification of at least 1,000 times or more, preferably 5,000 times or more. In addition, the particle size distribution index is determined using the value of the particle size obtained above based on the following numerical conversion formula.

It is important that the sphericity of the polyamide particles is 80 to 100 to improve the toughness of the thermosetting resin cured product and improve the compressive strength after impact of CFRP. When the sphericity is less than 80, the compressive strength after impact of CFRP decreases. The sphericity is preferably 90 or more, more preferably 94 or more, and still more preferably 97 or more. The upper limit thereof is 100.

The sphericity of the polyamide particles is preferably 90 to 100, more preferably 94 to 100, and still more preferably 97 to 100.

The sphericity of the polyamide particles is determined using the minor axis and major axis of 30 particles randomly observed from a scanning electron micrograph according to the mathematical formula below:

$$S = \sum_{i=1}^{n}(b/a)/n \times 100$$

wherein S: sphericity, a: major axis, b: minor axis, and n: number of measurements (30).

The polyamide particles have surface smoothness of the particles and solidity that the inside of the particle is not porous. Such surface smoothness and solidity can be expressed by the amount of linseed oil absorbed by the polyamide particles. That is, particles with a smaller linseed oil absorption, which indicates the amount of linseed oil absorbed, are solid particles with a smooth surface without pores. The linseed oil absorption of the polyamide particles is 10 mL to 100 mL/100 g. When the linseed oil absorption of the polyamide particles is 10 mL to 100 mL/100 g, the compressive strength after impact is particularly maintained. The upper limit of the linseed oil absorption is preferably 90 mL/100 g or less, more preferably 80 mL/100 g or less, still more preferably 70 mL/100 g or less, and particularly preferably 60 mL/100 g or less. The lower limit of the linseed oil absorption is preferably 10 mL/100 g or more.

The linseed oil absorption of the polyamide particles is preferably 10 to 90 mL/100 g, more preferably 10 to 80 mL/100 g, and still more preferably 10 to 70 mL/100 g.

The linseed oil absorption is measured in accordance with Japanese Industrial Standard (JIS Standard) JIS K 5101 (2004) "Test methods for pigments, linseed oil method."

The blending amount of the polyamide particles [C] is preferably 1 to 30 parts by mass based on 100 parts by mass of the thermosetting resin composition. The blending amount can be appropriately adjusted, but when the blending amount is large, the wet heat compression properties may be deteriorated, whereas when the blending amount is small, the compressive strength after impact may be deteriorated.

The particle size distribution index of the polyamide particles is preferably 1.00 to 3.00. The particle size distribution index herein refers to a particle size distribution. When the particle size distribution index exceeds 3.00, the moldability of the prepreg may be deteriorated. The particle size distribution index is preferably 2.00 or less, more preferably 1.50 or less, still more preferably 1.30 or less, most preferably 1.20 or less. The lower limit thereof is theoretically 1.00.

$$D_n = \left(\sum_{i=1}^{n} D_i\right)/n \quad D_v = \sum_{i=1}^{n} D_i^4 / \sum_{i=1}^{n} D_i^3 \quad PDI = D_v/D_n$$

wherein Di: particle size of each particle, n: number of measurements (100), Dn: number average particle size, Dv: volume average particle size, and PDI: particle size distribution index.

The polyamide particles are preferably insoluble in the thermosetting resin [A] to exhibit the toughness of the thermosetting cured product and the compressive strength after impact of CFRP. The phrase "insoluble in the thermosetting resin [A]" means that the polyamide particles are not substantially dissolved in the thermosetting resin when the thermosetting resin in which the polyamide particles are dispersed is heated and cured. For example, dissolution of polyamide particles is determined by observation with a transmission electron microscope based on the fact that the polyamide particle do not substantially shrink from its original size in the thermosetting cured product and a clear interface is observed between the polyamide particle and the thermosetting resin. Alternatively, the determination is made based on the fact that after the polyamide particles and the thermosetting resin are heated at 180° C., the recovered amount and size of the polyamide particles after removal of the thermosetting resin do not change.

The polyamide particles preferably contain 0.5 mass % or less of a second component having a weight average molecular weight of 20,000 or less based on 100 mass % of the polyamide particles [C].

When the weight average molecular weight of the polymer of the second component is too high, it is difficult to remove the polymer by washing. Thus, the weight average molecular weight of the polymer of the second component is preferably 20,000 or less, more preferably 10,000 or less, and particularly preferably 8,000 or less.

The weight average molecular weight of the polymer of the second component refers to a weight average molecular weight converted from a value measured by gel permeation chromatography using water as a solvent in terms of polyethylene glycol. When the polymer is not dissolved in water, a suitable solvent such as tetrahydrofuran can be selected.

As the polymer of the second component, it is preferable to use a polymer with a small content of polar groups such as a hydroxyl group, an amino group, and a carboxyl group because aggregation of polyamide particles due to the second component polymers and deterioration of wet heat properties can be suppressed. In particular, the polymer of the second component preferably contains hydroxyl groups only at both terminals of the molecule of the polymer. Specific examples of the polymer of the second component include one or more compounds selected from the group consisting of polyethylene glycol, polypropylene glycol, polytetramethylene glycol, polyethylene glycol-polypropylene glycol copolymers, and alkyl ethers thereof. Polyethylene glycol, a polyethylene glycol-polypropylene glycol copolymer, and an alkyl ether thereof are preferable, and polyethylene glycol and an alkyl ether thereof are most preferable because water can be used for washing and the like, and all the processes from production of particles to washing can be performed only with water. Two or more types of polymers of the second component may be simultaneously used as long as the desired effect is not impaired.

As the content of the polymer of the second component that becomes an impurity of the polyamide particles is smaller, the dispersibility of the polyamide particles in the thermosetting resin tends to be improved and the deterioration of the wet heat compression performance of CFRP tends to be prevented. The content of impurities in the polyamide particles is preferably 0.5 mass % or less, more preferably 0.05 mass % or less, particularly preferably 0.005 mass % or less, and still more preferably 0.002 mass % or less based on 100 mass % of the polyamide particles.

The content of the polymer of the second component indicates a numerical value determined by gel permeation chromatography using water as a solvent after extraction from the polymer powder with water or an organic solvent, and removal of the solvent.

As a method of producing polyamide particles, for example, a method described in WO 2018/207728 is suitably usable in which a polyamide monomer is polymerized in the presence of a polymer as a second component at a temperature higher than the crystallization temperature of the polyamide obtained by polymerizing the monomer, and then the resultant powder is washed and dried to produce polyamide particles. With this method, it is possible to produce true spherical polyamide particles having a high melting point, which is a requirement.

Various types of additives may be blended in the thermosetting resin composition as long as the desired effects are not impaired. Examples of the additive include a curing accelerator, a flame retardant, a fluidizing agent, a lubricant, an antioxidant, a viscosity modifier, and known substances such as a thermoplastic resin for a toughness modifier such as polyethersulfone, polyetherimide, and polyphenylene ether.

The thermosetting resin cured product is produced by curing a thermosetting resin composition.

The glass transition temperature of the thermosetting resin cured product is preferably 120 to 250° C., more preferably 140 to 210° C. to cause the resultant composite material to ensure a sufficient heat resistance and compressive strength under wet heat conditions required for an airplane material.

The fiber-reinforced composite material contains a thermosetting resin cured product and reinforcing fibers.

As the reinforcing fibers to be used in the fiber-reinforced composite material, carbon fibers, silicon carbide fibers, glass fibers, aramid fibers are preferably used, for example. Carbon fibers are preferably used to provide a fiber-reinforced composite material that is particularly lightweight and has high performance and excellent mechanical properties.

Specific examples of the carbon fibers preferably used as the reinforcing fibers include acrylic-based, pitch-based, and rayon-based carbon fibers, and particularly, acrylic-based carbon fibers having high tensile strength are preferably used.

Such acrylic-based carbon fibers can be obtained, for example, by spinning a spinning dope containing polyacrylonitrile obtained from a monomer including acrylonitrile as a main component by a wet spinning method, a dry-wet spinning method, a dry spinning method, or a melt spinning method to obtain coagulated yarns, and subjecting the coagulated yarns after spinning to a spinning process to form a precursor, followed by processes such as stabilization and carbonization.

Twisted yarns, untwisted yarns, and non-twisted yarns can be used as the form of the carbon fibers. In twisted yarns, the blend of the filaments constituting the reinforcing fiber bundle is not parallel, which may cause a decrease in mechanical properties of the fiber-reinforced composite material. Therefore, there are preferably used untwisted yarns or non-twisted yarns having a good balance between moldability and strength properties of the fiber-reinforced composite material.

When the fiber-reinforced composite material is molded in an autoclave or an oven, the optimum temperature and time vary depending on the type and amount of curing agent or curing catalyst to be selected. In applications requiring heat resistance at 130° C. or higher, curing is performed at a temperature of 120 to 220° C. over 0.5 to 8 hours. The temperature elevation rate is preferably 0.1 to 10° C./min. When the temperature elevation rate is less than 0.1° C./min, the time before reaching the target curing temperature may be very long, and the workability may be lowered. Alternatively, when the temperature elevation rate exceeds 10° C./min, there may be a temperature difference among various parts of the reinforcing fiber so that a uniform cured product may not be obtained.

At this time, it is important that the sphericity of the polyamide particles in the obtained fiber-reinforced composite material is 80 to 100. The polyamide particles having a high melting point and a high crystallization temperature can maintain their true spherical shapes without being deformed during thermal curing of the thermosetting resin. In addition, even if the polyamide particles are melted during heating and curing, when the particles are phase-separated into true spheres in the cured product, the polyamide particles exhibit the same properties. Whether the polyamide particles are a true sphere in the fiber-reinforced composite material can be confirmed by the same measurement method as the particles from the observation of the cross-sectional photograph.

When the fiber-reinforced composite material is molded, the pressure may be increased or decreased as necessary, although it is not essential. Increasing or decreasing the pressure may produce effects such as improvement in surface quality, suppression of internal voids, and improvement in adhesion to metal or plastic to be adhered during curing or to a component made of a fiber-reinforced composite material.

The fiber-reinforced composite material has high tensile strength, high impact resistance, and high chemical resistance, and thus can be widely used in general industrial applications such as windmills, automobiles, and bicycles, including aerospace applications requiring high mechanical properties.

In the prepreg, reinforcing fibers are impregnated with a thermosetting resin composition.

As the reinforcing fibers to be used in the prepreg, carbon fibers, silicon carbide fibers, glass fibers, aramid fibers are preferably used, for example. Carbon fibers are preferably used to provide a fiber-reinforced composite material that is particularly lightweight and has high performance and excellent mechanical properties.

Specific examples of the carbon fibers preferably used as the reinforcing fibers include acrylic-based, pitch-based, and rayon-based carbon fibers, and particularly, acrylic-based carbon fibers having high tensile strength are preferably used.

Such acrylic-based carbon fibers can be obtained, for example, by spinning a spinning dope containing polyacrylonitrile obtained from a monomer including acrylonitrile as a main component by a wet spinning method, a dry-wet spinning method, a dry spinning method, or a melt spinning method to obtain coagulated yarns, and subjecting the coagulated yarns after spinning to a spinning process to form a precursor, followed by processes such as stabilization and carbonization.

Twisted yarns, untwisted yarns, and non-twisted yarns can be used as the form of the carbon fibers. In twisted yarns, the blend of the filaments constituting the reinforcing fiber bundle is not parallel, which may cause a decrease in mechanical properties of the fiber-reinforced composite material. Therefore, there are preferably used untwisted yarns or non-twisted yarns having a good balance between moldability and strength properties of the fiber-reinforced composite material.

The method of kneading the thermosetting resin composition to be used in the prepreg may be any method that is generally used for preparation of an epoxy resin composition. A kneader, a planetary mixer or the like is used.

The prepreg can be produced by a wet process, a hot-melt process or the like described below.

The wet process is a method of immersing reinforcing fibers in a solution of an epoxy resin composition, then removing the reinforcing fibers from the solution, and evaporating the solvent by an oven or the like. The hot-melt process is a method of directly impregnating reinforcing fibers with an epoxy resin composition reduced in viscosity by heating, or a method of preparing a film in which an epoxy resin composition is applied once to release paper or the like, then overlaying the film on both sides or one side of reinforcing fibers, and heating and pressurizing the resultant laminate to impregnate the reinforcing fibers with the resin. The hot-melt process is preferable because substantially no solvent remains in the prepreg.

The fiber-reinforced composite material is preferably produced by curing the prepreg.

To cure and mold such a thermosetting resin, which has a relatively high heat resistance, and a prepreg produced using this resin, a relatively high curing temperature is required. Furthermore, to cause a fiber-reinforced composite material obtained by curing and molding any prepreg laminated product to exhibit a sufficient strength, the curing and molding of the prepreg laminated product are conducted generally under a pressurized condition that the pressure is 1 atmospheric pressure or more. The fiber-reinforced composite material containing, for example, a cured product of a thermosetting resin composition and reinforcing fibers is produced by a method of laminating the resultant prepreg, followed by heating and curing while applying pressure to the laminated product, or the like. Examples of the method of applying heat and pressure include press molding, autoclave molding, bagging molding, wrapping, and internal pressure molding.

The fiber-reinforced composite material has high tensile strength, high impact resistance, and high chemical resistance, and thus can be widely used in general industrial applications such as windmills, automobiles, and bicycles, including aerospace applications requiring high mechanical properties.

EXAMPLES

Hereinafter, our compositions, products, prepregs and materials will be described based on Examples, but this disclosure is not limited thereto.

Raw Materials

Thermosetting Resins [A]: Epoxy Resins

"SUMI-EPOXY (registered trademark)" ELM434 (tetraglycidyldiaminodiphenylmethane, manufactured by Sumitomo Chemical Co., Ltd.)

"Araldite (registered trademark)" MY0600 (m-aminophenol type epoxy resin, manufactured by Huntsman Advanced Materials LLC.)

"EPICLON (registered trademark)" 830 (bisphenol F type epoxy resin, manufactured by DIC Corp.)

Curing Agent [B]: Epoxy Resin Curing Agent 3,3'-DAS (3,3'-diaminodiphenylsulfone, manufactured by Mitsui Fine Chemical, Inc.)

Other Components

"SUMIKAEXCEL (registered trademark)" PES5003P (polyethersulfone, manufactured by Sumitomo Chemical Co., Ltd.)

Polyamide Particles [C]

(1) Average Particle Size and Particle Size Distribution Index

The number average particle size of the polyamide fine particles was obtained by randomly specifying 100 particle diameters from a scanning electron micrograph and calculating the arithmetic average thereof. In the above micrograph, when the particle was not a perfect circle, that is, when the particle was elliptical, the maximum size of the particle was defined as the particle size. In addition, the particle size distribution index was calculated using the value of the particle size obtained above based on the numerical conversion formula below:

$$D_n = \left(\sum_{i=1}^{n} D_i\right)/n \quad D_v = \sum_{i=1}^{n} D_i^4 / \sum_{i=1}^{n} D_i^3 \quad PDI = D_v/D_n$$

wherein Di: particle size of each particle, n: number of measurements (100), Dn: number average particle size, Dv: volume average particle size, and PDI: particle size distribution index.

(2) Sphericity

The sphericity of the polyamide particles was calculated using the minor axis and major axis of 30 particles randomly observed from a scanning electron micrograph according to the mathematical formula below:

$$S = \sum_{i=1}^{n} (b/a)/n \times 100$$

wherein S: sphericity, a: major axis, b: minor axis, and n: number of measurements (30).

(3) Linseed Oil Absorption

In accordance with Japanese Industrial Standard (JIS Standard) JIS K 5101 "Test methods for pigments, linseed oil method," about 100 mg of polyamide fine particles were precisely weighed on a watch glass, refined linseed oil (manufactured by Kanto Chemical Co., Inc.) was gradually added dropwise to the fine particles with a burette, and the mixture was kneaded with a pallet knife. The dropwise addition and kneading were repeated until a lump of the sample was formed, and this operation was terminated at a timing at which a paste of the sample became smooth. The oil absorption (mL/100 g) was calculated from the amount of refined linseed oil used for the dropwise addition.

(4) Melting Point and Crystallization Temperature of Polyamide Constituting Polyamide Particles The apex of an endothermic peak when the temperature was raised from 30° C. at a rate of 20° C./min in a nitrogen atmosphere by a differential scanning calorimeter (DSCQ20, manufactured by TA Instruments) was defined as the melting point. The presence of the crystallization temperature was determined based on the presence of an exothermic peak that appears when the temperature is raised from 30° C. to a temperature 30° C. higher than the endothermic peak indicating the melting point of the polyamide at a rate of 20° C./min, held for 1 minute, and then cooled to 30° C. at a rate of 20° C./min in a nitrogen atmosphere using the same apparatus. When the exothermic peak is present, it is determined to be crystalline. The amount of polyamide fine particles required for the measurement was about 8 mg.

(5) Molecular Weight of Polyamide Constituting Polyamide Particles

The weight average molecular weight of the polyamide was calculated by comparison with a calibration curve calibrated with polymethyl methacrylate by gel permeation chromatography. The measurement sample was adjusted by dissolving about 3 mg of polyamide fine particles in about 3 g of hexafluoroisopropanol.
Apparatus: Waters e-Alliance GPC system
Column: HFIP-806M×2, manufactured by Showa Denko K. K.
Mobile phase: 5 mmol/L sodium trifluoroacetate/hexafluoroisopropanol
Flow rate: 1.0 ml/min
Temperature: 30° C.
Detection: differential refractometer.

(6) Content of Impurity (Second Component Polymer) in Polyamide Particles

To 1,000 g of polyamide particles was added 1,000 g of water, and after the mixture was heated to 80° C., water was isolated. After removal of water, the obtained solid product was dissolved in 5 g of water, and the weight of the polymer of the second component was measured by gel permeation chromatography as in (7) below. The content (mass %) of the impurity was calculated by dividing the weight of the polymer of the second component by the amount of the polyamide particles.

(7) Molecular Weight of Impurity (Second Component Polymer)

The weight average molecular weight of the polymer as the impurity was calculated by comparison with a calibration curve calibrated with polyethylene glycol by gel permeation chromatography. The measurement sample was adjusted by dissolving about 3 mg of the polymer in about 6 g of water.

Apparatus: LC-10A Series, manufactured by Shimadzu Corporation
Column: TSKgel G3000 PWXL, manufactured by Tosoh Corporation
Mobile phase: 100 mmol/L aqueous sodium chloride solution
Flow rate: 0.8 ml/min
Temperature: 40° C.
Detection: differential refractometer.

(8) Method of Measuring Constituent Unit of Formula (1)

After dissolving 10 g of polyamide particles in 90 g of hydrochloric acid, the solution was heated and stirred at 100° C. for 12 hours. Thereafter, the amount of ε-caprolactam was quantified by gas chromatography, and mass % of ε-caprolactam in the constituent unit was calculated.

Particles 1 Production Example 1

With reference to WO 2018/207728, 200 g of ε-caprolactam (manufactured by Toray Industries, Inc.), 800 g of polyethylene glycol (class 1 polyethylene glycol 20,000, manufactured by Wako Pure Chemical Industries, Ltd., weight average molecular weight 18,600) as the polymer of the second component, and 1,000 g of water were charged in an autoclave equipped with a 3 L helical ribbon type stirring blade, and a uniform solution was prepared. Then, the autoclave was sealed, and the inside of the autoclave was purged with nitrogen. Thereafter, the stirring speed was set to 100 rpm, and the temperature was raised to 240° C. At this time, after the pressure of the system reached 10 kg/cm$^2$, the pressure was controlled while slightly releasing water vapor so that the pressure was maintained at 10 kg/cm$^2$. After the temperature reached 240° C., the pressure was released at a rate of 0.2 kg/cm$^2$·min. Thereafter, the temperature was maintained for 1 hour while nitrogen was allowed to flow, to complete the polymerization. The mixture was discharged into a 2,000 g water bath to yield a slurry. Soluble components were dissolved, and the resultant slurry was filtrated to obtain a solid material on the filter. Then, 2,000 g of water was added to the solid material, followed by washing at 80° C. Thereafter, a slurry liquid excluding aggregates, which has passed through a 200 μm sieve, was filtered again to isolate a solid material on the filter. The isolated solid material was then dried at 80° C. for 12 hours to prepare 140 g of a polyamide 6 powder. The obtained powder had a melting point of 218° C., a crystallization temperature of 170° C., and a molecular weight of 40,000 similar to those of polyamide 6. The obtained powder had a number average particle size of 12 μm, a particle size distribution index of 1.35, a sphericity of 96, a linseed oil absorption of 56 mL/100 g, and a polyethylene glycol content of 0.004 mass %.

Particles 2 Production Example 2

True spherical polyamide 6 particles having a number average particle size of 30 μm were adjusted in the same manner as in Production Example 1 except that the stirring speed was changed to 50 rpm.

Particles 3 Production Example 3

True spherical polyamide 6 particles having a number average particle size of 5 μm were adjusted in the same manner as in Production Example 1 except that the stirring speed was changed to 250 rpm.

Particles 4 Production Example 4

Polyamide 8 particles were obtained in the same manner as in Production Example 1 except that ε-caprolactam was changed to capryllactam (manufactured by Wako Pure Chemical Industries, Ltd.). The particles had a melting point of 200° C., a crystallization temperature of 150° C., a molecular weight of 40,000, a number average particle size of 13 μm, a particle size distribution index of 1.40, a sphericity of 98, and a linseed oil absorption of 60 mL/100 g.

Particles 5 Production Example 5

Copolymer particles of polyamide 6/12 (polyamide 6: 80 mol %) were obtained in the same manner as in Production Example 1 except that single use of ε-caprolactam was changed to a combination of 140 g of ε-caprolactam (manufactured by Toray Industries, Inc.) and 60 g of laurolactam (manufactured by Wako Pure Chemical Industries, Ltd.). The particles had a melting point of 205° C., a crystallization temperature of 156° C., a molecular weight of 35,000, a number average particle size of 15 a particle size distribution index of 1.25, a sphericity of 98, and a linseed oil absorption of 55 mL/100 g.

Particles 6 Production Example 6

Polyamide 66 particles were obtained in the same manner as in Production Example 1 except that ε-caprolactam was changed to a combination of 170 g of adipic acid (manufactured by Tokyo Chemical Industry Co., Ltd., SP value: 25.4) and 220 g of a 50% aqueous solution of hexamethylenediamine (manufactured by Tokyo Chemical Industry Co., Ltd., SP value: 19.2), and the temperature was changed to 260° C. The particles had a melting point of 267° C., a crystallization temperature of 211° C., a molecular weight of 40,000, a number average particle size of 20 μm, a particle size distribution index of 1.52, a sphericity of 98, and a linseed oil absorption of 60 mL/100 g.

Particles 7 Production Example 7

With reference to WO 2012/043509, 21 g of polyamide "TROGAMID (registered trademark)" CX7323 (weight average molecular weight: 17,000, manufactured by Daicel-Evonik Ltd.), 287 g of N-methyl-2-pyrrolidone as an organic solvent, and 42 g of polyvinyl alcohol having a sodium acetate content of 0.1% or less (weight average molecular weight: 29,000) were charged in a 1,000 ml pressure-resistant glass autoclave (Hyper Glaster TEM-V1000N, manufactured by Taiatsu Techno Corporation). The inside of the autoclave was purged with a nitrogen gas having a purity of 99 vol. % or more, followed by heating at 180° C. and stirring for 4 hours to ensure dissolution of the polymers. Subsequently, 350 g of ion-exchanged water as a poor solvent was supplied through a solution feeding pump, and dropped at a rate of 2.91 g/min. After about 30 g of ion-exchanged water was poured thereinto, the temperature was lowered while the system was stirred, and the resultant suspension was filtrated. To the solid was added 700 g of ion-exchange water to subject the solid to re-slurry washing. The solid separated by the filtration was vacuum-dried at 80° C. for 10 hours to yield 20.0 g of a white solid. The obtained powder had a melting point of 250° C., no crystallization temperature, a number average particle size of 12.4 µm, a particle size distribution index of 1.30, a sphericity of 95, and a linseed oil absorption of 65 mL/100 g.

Particles 8

Commercially available polyamide 6 particles ("Orgasol (registered trademark)" 1002D, manufactured by Arkema, number average particle size: 18 µm, sphericity: 68, melting point: 212° C., crystallization temperature: 165° C., weight average molecular weight: 34,400, linseed oil absorption: 90 mL/100 g)

Particles 9

Commercially available polyamide 6 particles (TR-1, manufactured by Toray Industries, Inc., number average particle size: 13 µm, sphericity: 82, melting point: 217° C., crystallization temperature: 170° C., linseed oil absorption: 120 mL/100 g)

Particles 10

Commercially available polyamide 12 particles (SP-500, manufactured by Toray Industries, Inc., number average particle size: 5 µm, sphericity: 97, melting point: 175° C., crystallization temperature: 140° C., linseed oil absorption: 60 mL/100 g)

Reinforcing Fibers: Carbon Fibers

"TORAYCA (registered trademark)" T800G-24K-31E (manufactured by Toray Industries, Inc.; carbon fiber with the number of filaments: 24,000, tensile strength: 5.9 GPa, tensile modulus: 294 GPa, and tensile elongation: 2.0%).

(9) Preparation of Thermosetting Resin Composition

Into the system, 10 parts by mass of "SUMI-EPOXY (registered trademark)" ELM434, 70 parts by mass of "Araldite (registered trademark)" MY0600, 20 parts by mass of "EPICLON (registered trademark)" 830, and 15 parts by mass of "SUMIKAEXCEL (registered trademark)" 5003P as a thermosetting resin [A], 40 parts by mass of 3,3'-DAS as a curing agent [B], and 65 part by mass of particle components as polyamide particles [C] were charged, and the components were kneaded to yield an epoxy resin composition.

(10) Production of Prepreg

Two films were prepared in which the thermosetting resin composition of (9) above was applied onto release paper so that the total basis weight of the thermosetting resin [A] and the curing agent [B] was 35 g/m². Carbon fibers having 24,000 filaments ("TORAYCA (registered trademark)" T800G, manufactured by Toray Industries, Inc.) were aligned in one direction between the two films with the coating surfaces of the films faced each other. The resultant laminate was heated and pressurized to impregnate the carbon fibers with the resin, thereby preparing a primary prepreg having a basis weight of carbon fiber of 250 g/m² and a resin content of 21.9 mass %. Next, two films were prepared in which the thermosetting resin composition of (9) above was applied onto release paper so that the basis weight thereof was 35 g/m². The primary prepreg was placed between the secondary resin coating films facing each other. The resultant laminate was heated and pressurized in the same manner as in the primary prepreg, thereby preparing a secondary prepreg having a basis weight of carbon fiber of 250 g/m² and a resin content of 35.9 mass %.

(11) Measurement of Flexural Modulus and Flexural Strain of Thermosetting Resin Cured Product The thermosetting resin composition prepared in (9) above was degassed in vacuum, and then injected into a mold that was set to have a thickness of 2 mm with a 2 mm-thick "Teflon (registered trademark)" spacer. The thermosetting resin composition was cured at a temperature of 180° C. for 2 hours to yield a thermosetting resin cured product having a thickness of 2 mm. Next, a test piece with a width of 10 mm and length of 60 mm was cut out from the plate of the obtained thermosetting resin cured product, and a three-point bending test was conducted with a span of 32 mm. The flexural modulus, flexural strength, and flexural strain of the sample were determined in accordance with JIS K7171-1994. The flexural strain is an index indicating the toughness of the thermosetting resin cured product.

(12) Measurement of Compressive Strength Under Wet Heat Conditions of Fiber-Reinforced Composite Material A total of 12 prepreg plies adjusted in (10) above were laminated with their fibers aligned parallel to the compression direction and cured in an autoclave under the conditions of a pressure of 0.59 MPa, a temperature elevation rate of 1.5° C./min, and 2 hours at a temperature of 180° C. to give a laminated product. From this laminated product, a tabbed test piece with a thickness of 2 mm, width of 15 mm, and length 78 mm was prepared and immersed in warm water at 71° C. for 14 days. This test piece was subjected to 0° compressive strength measurement at 82° C. using a universal tester equipped with a temperature controlled bath in accordance with JIS K7076 (1991). Five test pieces were prepared (n=5). The 0° compressive strength at 82° C. is an index indicating compression performance under wet heat conditions.

(13) Measurement of Compressive Strength After Impact of Fiber-Reinforced Composite Material Prepregs adjusted in (10) above were laminated with a configuration of [45°/0°/−45°/90°] 3s (symbol s indicates mirror symmetry). The resultant laminate was heated and cured in an autoclave at a temperature of 177° C. and a pressure of 0.6 MPa for 2 hours to give CFRP. The CFRP was cut into a rectangle having a size of 152.4 mm in a 0 degree direction and 101.6 mm in a 90 degree direction in accordance with JIS K7089 (1996). A drop impact of 5.4 kg was applied to the center of the rectangle at a dropping height of 571 mm to determine the average compressive strength after impact. The measurement was performed at room temperature in a dry state (25° C.±2° C., relative humidity: 50%).

Examples 1 to 6 and Comparative Examples 1 to 4

Thermosetting resin compositions were prepared by the procedure described in (9) above, and then prepregs were obtained by the procedure described in (10) above. The measurements described in (12) above of Measurement of compressive strength under wet heat conditions of fiber-reinforced composite material, (13) above of Measurement of compressive strength after impact of fiber-reinforced composite material, and (2) above of Measurement of sphericity of polyamide particles in fiber-reinforced composite material were performed using the obtained resin compositions and prepregs. The polyamide particles [C] used and the measurement results of physical properties are shown in Tables 1 and 2.

TABLE 1

| | | | Example 1 Particles 1 | Example 2 Particles 2 | Example 3 Particles 3 | Example 4 Particles 4 | Example 5 Particles 5 | Example 6 Particles 6 |
|---|---|---|---|---|---|---|---|---|
| Configuration and physical properties of particles | Constituent unit of general formula (1) of polyamide resin constituting polyamide particles | Mass % | 100 | 100 | 100 | 100 | 70 | 0 |
| | Melting point of polyamide resin constituting polyamide particles | ° C. | 218 | 217 | 218 | 200 | 205 | 267 |
| | Crystallization temperature of polyamide constituting polyamide particles | ° C. | 170 | 174 | 173 | 150 | 156 | 211 |
| | Number average particle size | μm | 12 | 30 | 5 | 13 | 15 | 20 |
| | Sphericity | | 96 | 96 | 97 | 98 | 98 | 98 |
| | Linseed oil absorption | mL/100 g | 56 | 60 | 63 | 60 | 55 | 60 |
| | Particle size distribution index | | 1.35 | 1.20 | 1.29 | 1.40 | 1.25 | 1.52 |
| | Molecular weight of polyamide constituting polyamide particles | g/mol | 40,000 | 35,000 | 35,000 | 40,000 | 35,000 | 40,000 |
| | Content of second component polymer | Mass % | 0.004 | 0.002 | 0.005 | 0.02 | 0.03 | 0.01 |
| | Weight average molecular weight of second component polymer | g/mol | 18,600 | 18,600 | 18,600 | 18,600 | 18,600 | 18,600 |
| Properties of thermosetting resin cured product | Flexural modulus | GPa | 3.7 | 3.7 | 3.6 | 3.3 | 3.2 | 4.1 |
| | Flexural strength | MPa | 182 | 178 | 180 | 165 | 160 | 200 |
| | Flexural strain | % | 12 | 11 | 12 | 13 | 13 | 9 |
| Properties of CFRP | Compressive strength after impact | MPa | 320 | 315 | 318 | 320 | 330 | 300 |
| | 0° compressive strength at 82° C. | MPa | 1180 | 1170 | 1160 | 1000 | 1000 | 1250 |

TABLE 2

| | | | Comparative Example 1 Particles 7 | Comparative Example 2 Particles 8 | Comparative Example 3 Particles 9 | Comparative Example 4 Particles 10 |
|---|---|---|---|---|---|---|
| Configuration and physical properties of particles | Constituent unit of general formula (1) of polyamide resin constituting polyamide particles | Mass % | 0 | 100 | 100 | 0 |
| | Melting point of polyamide resin constituting polyamide particles | ° C. | 250 | 212 | 217 | 175 |
| | Crystallization temperature of polyamide constituting polyamide particles | ° C. | Absent | 165 | 170 | 140 |
| | Number average particle Size | μm | 12.4 | 18 | 13 | 5 |
| | Sphericity | | 95 | 68 | 82 | 97 |
| | Linseed oil absorption | mL/100 g | 65 | 90 | 120 | 60 |
| | Particle size distribution index | | 1.30 | 1.30 | 1.21 | 1.12 |
| | Molecular weight of polyamide constituting polyamide particles | g/mol | 17,000 | 34,400 | 44,000 | — |
| | Content of second component polymer | Mass % | 0.6 | — | — | — |

TABLE 2-continued

|  |  |  | Comparative Example 1 Particles 7 | Comparative Example 2 Particles 8 | Comparative Example 3 Particles 9 | Comparative Example 4 Particles 10 |
|---|---|---|---|---|---|---|
|  | Weight average molecular weight of second component polymer | g/mol | 29,000 | — | — | — |
| Properties of thermosetting resin cured product | Flexural modulus | GPa | 3.0 | 3.7 | 3.5 | 2.7 |
|  | Flexural strength | MPa | 155 | 171 | 170 | 110 |
|  | Flexural strain | % | 10 | 6 | 6 | 15 |
| Properties of CFRP | Compressive strength after impact | MPa | 290 | 270 | 260 | 350 |
|  | 0° compressive strength at 82° C. | MPa | 980 | 1150 | 1140 | 700 |

INDUSTRIAL APPLICABILITY

Our thermosetting resin composition enables suitable production of a fiber-reinforced composite material having sufficient compressive strength after impact and wet heat compression performance.

A thermosetting resin composition can be suitably used as a prepreg, and further as a thermosetting resin cured product which is a matrix resin of a fiber-reinforced composite material.

A fiber-reinforced composite material produced using the thermosetting resin composition has high tensile strength, high impact resistance, and high chemical resistance, and thus can be widely used for general industrial applications such as windmills, automobiles, and bicycles, including aerospace applications requiring high mechanical properties.

The invention claimed is:

1. A thermosetting resin composition comprising:
[A] a thermosetting resin;
[B] a curing agent; and
[C] polyamide particles, wherein the polyamide particles contain a polyamide resin comprising a constituent unit of formula (1):

(1)

where n represents an integer of 4 to 7, and wherein the polyamide particles satisfy (c1) to (c5):
(c1) a melting point of polyamide resin constituting the polyamide particles is 200 to 300° C.;
(c2) a crystallization temperature of the polyamide resin constituting the polyamide particles is 150° C. to 250° C.;
(c3) a number average particle size of the polyamide particles is 1 to 100 um;
(c4) a sphericity of the polyamide particles is 80 to 100; and
(c5) a linseed oil absorption of the polyamide particles is 10 to 100 mL/100 g;
(c6) having no exothermic peak in the temperature range between the glass transition temperature and the melting point.

2. The thermosetting resin composition according to claim 1, wherein the polyamide resin constituting the polyamide particles [C] contains 60 mass % or more of a constituent unit of formula (1) where n represents an integer of 4 to 7.

3. The thermosetting resin composition according to claim 1, wherein a particle size distribution index of the polyamide particles [C] is 1.00 to 3.00.

4. The thermosetting resin composition according to claim 1, wherein n in formula (1) is 5.

5. The thermosetting resin composition according to claim 1, wherein a sphericity of the polyamide particles [C] is 90 to 100.

6. The thermosetting resin composition according to claim 1, wherein the thermosetting resin composition contains 0.5 mass % or less of a second component having a weight average molecular weight of 20,000 or less based on 100 mass % of the polyamide particles [C].

7. The thermosetting resin composition according to claim 1, wherein the thermosetting resin [A] is an epoxy resin.

8. A thermosetting resin cured product obtained by curing the thermosetting resin composition according to claim 1.

9. A fiber-reinforced composite material comprising the thermosetting resin cured product according to claim 8 and reinforcing fibers.

10. A prepreg comprising reinforcing fibers impregnated with the thermosetting resin composition according to claim 1.

11. A fiber-reinforced composite material obtained by curing the prepreg according to claim 10.

* * * * *